United States Patent
Wang et al.

(10) Patent No.: US 7,630,028 B2
(45) Date of Patent: Dec. 8, 2009

(54) COLOR LIQUID CRYSTAL DISPLAY HAVING A BLUE LIGHT SOURCE AND FLUORESCENT WAVELENGTH CONVERSION AREAS

(75) Inventors: Po Hsien Wang, Taichung (TW); Hsuan Yang Chen, Wurih Township (TW)

(73) Assignee: Wintek Corporation, Taichung (TW)

( * ) Notice: Subject to any disclaimer, the term of this patent is extended or adjusted under 35 U.S.C. 154(b) by 164 days.

(21) Appl. No.: 11/696,051

(22) Filed: Apr. 3, 2007

(65) Prior Publication Data

US 2007/0229736 A1    Oct. 4, 2007

(30) Foreign Application Priority Data

Apr. 4, 2006    (TW) .............................. 95111887 A

(51) Int. Cl.
    *G02F 1/1335*    (2006.01)
(52) U.S. Cl. .......................................... 349/71; 349/70
(58) Field of Classification Search .................. 349/70, 349/71, 80
    See application file for complete search history.

(56) References Cited

U.S. PATENT DOCUMENTS

| | | | | |
|---|---|---|---|---|
| 4,364,640 A | * | 12/1982 | Kruger et al. ................. | 349/70 |
| 4,799,050 A | * | 1/1989 | Prince et al. .................. | 349/71 |
| 6,683,659 B2 | * | 1/2004 | Dirscherl et al. .............. | 349/32 |
| 6,844,903 B2 | * | 1/2005 | Mueller-Mach et al. ....... | 349/70 |
| 2004/0189907 A1 | * | 9/2004 | Tominaga et al. ............ | 349/115 |
| 2006/0063463 A1 | * | 3/2006 | Kim et al. ..................... | 445/26 |
| 2007/0058107 A1 | * | 3/2007 | Im et al. ....................... | 349/71 |

* cited by examiner

*Primary Examiner*—Michael H Caley
*Assistant Examiner*—Michael Inadomi

(57) ABSTRACT

A color liquid crystal display includes a wavelength converter having a plurality of wavelength conversion areas and a plurality of transparent areas. The wavelength conversion areas are disposed at the positions corresponding to red and green filters while the transparent areas are disposed at the positions corresponding to blue filters. After passing through the wavelength conversion areas, a blue light is converted to a broadband yellow light. The broadband yellow light will be subsequently converted to a red or green light of interest when it passes through red or green filters. The blue light will experience no change in wavelength when it passes through the transparent areas. With such arrangement, the displayed brightness and saturation of red and green colors can be improved, and the displayed brightness and saturation of blue color can also be enhanced.

20 Claims, 6 Drawing Sheets ns and saturation of red and green colors as well as enhance the displayed brightness and saturation of blue color.

In one embodiment, the color liquid crystal display includes two opposite upper and lower transparent substrates, a liquid crystal layer, a plurality of red filters, a plurality of green filters, a backlight module, a wavelength converter and two polarizers. The liquid crystal layer is disposed between the two transparent substrates. The surface of one transparent substrate facing the opposite transparent substrate has a plurality of first areas, a plurality of second areas and a plurality of third areas. The red filters are disposed on the first areas and the green filters are disposed on the second areas. The backlight module has a blue light source and is disposed below the lower transparent substrate. The wavelength converter has a plurality of wavelength conversion areas and a plurality of transparent areas, and is disposed between the lower transparent substrate and backlight module. The wavelength conversion areas are disposed at the positions corresponding to the red filters and green filters. The transparent areas are disposed at the positions corresponding to the third areas. One polarizer is disposed above the upper transparent substrate and the other polarizer is disposed between the wavelength converter and lower transparent substrate.

In another embodiment, the color liquid crystal display further includes a reflection layer having a plurality of openings thereon and the reflection layer is disposed on the lower transparent substrate and faces the upper transparent substrate.

The foregoing, as well as additional objects, features and advantages of the invention will be more readily apparent from the following detailed description, which proceeds with reference to the accompanying drawings.

COLOR LIQUID CRYSTAL DISPLAY HAVING A BLUE LIGHT SOURCE AND FLUORESCENT WAVELENGTH CONVERSION AREAS

RELATED APPLICATIONS

The present application is based on, and claims priority from, Taiwanese Application Number 095111887, filed Apr. 4, 2006, the disclosure of which is hereby incorporated by reference herein in its entirety.

BACKGROUND OF THE INVENTION

1. Field of the Invention

This invention generally relates to a color liquid crystal display, and more particularly, to a transmissive or transflective color liquid crystal display.

2. Description of the Related Art

In general, a transmissive color liquid crystal display (LCD) is provided with white light sources to illuminate the liquid crystal cell thereof. After passing through the inner color filters of the liquid crystal cell, the illuminating white light is filtered into three primary colors of red, green and blue. The mixture of the three primary colors can produce a full-color display image. The cold cathode fluorescent lamps (CCFLs) or white LEDs are commonly used to generate the illuminating white light.

With reference to FIG. 1, a conventional color LCD 100 includes a liquid crystal cell 140 comprising a liquid crystal layer 146 sandwiched in between two transparent substrates 142 and 144. A plurality of color filters 148 is disposed between the substrates 142 and 144. Polarizers 150 and 130 are arranged such that the substrates 142 and 144 are between the polarizers 150 and 130. A backlight module 110 including a white light source 112 such as white LED is disposed below the polarizer 130.

After passing through the polarizer 130, the white light emitted from the white light source 112 is polarized into a light of specified polarization and then incident upon the liquid crystal cell 140. When the polarized white light passes through the color filters 148 and travels through the twisted liquid crystal molecules, the polarized white light is filtered and transformed into red, green and blue lights of different polarization. The filtered lights are then incident upon the polarizer 150 and turned into lights of different colors and intensities. The mixture of the lights of different colors and intensities produces a full-color display image.

In order to emit the illuminating white light, a fluorescent material is coated on the surface of the LED 112 or doped in the LED 112. The fluorescent material can convert the blue light emitted from LED to the illuminating white light. Because the composition of the fluorescent material can substantially change the rate of the blue light converted to the yellow light, it is difficult to achieve the desired composition of the fluorescent material. Furthermore, it is still unsatisfied for the color purity and brightness of the color lights which are converted from the white light after it passes through the color filters.

In view of the above, there exists a need to provide a color liquid crystal display that has improved color purity and brightness.

SUMMARY OF THE INVENTION

It is an object of the present invention to provide a color liquid crystal display that can improve the displayed bright-

DETAILED DESCRIPTION OF THE PREFERRED EMBODIMENT

Figure 1:
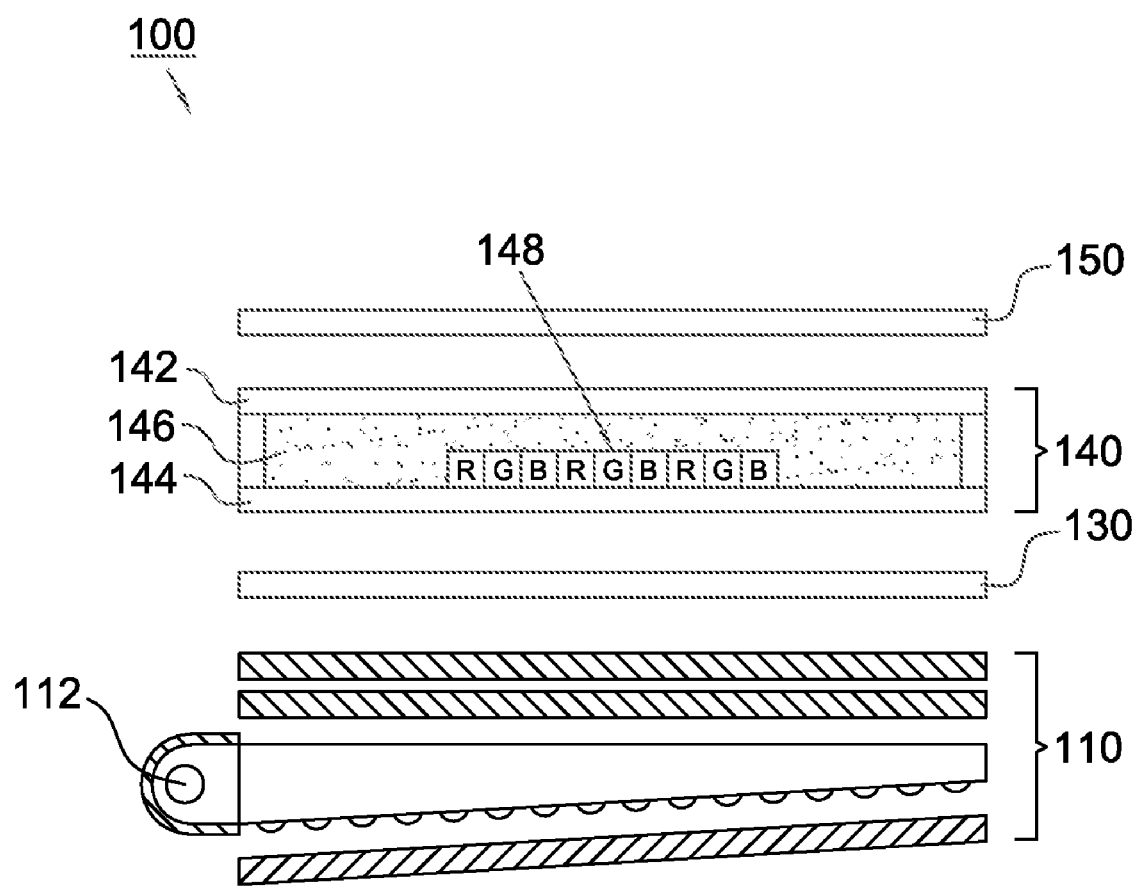
FIG. 1 is a schematic diagram illustrating a conventional color liquid crystal display.
Figure 2:
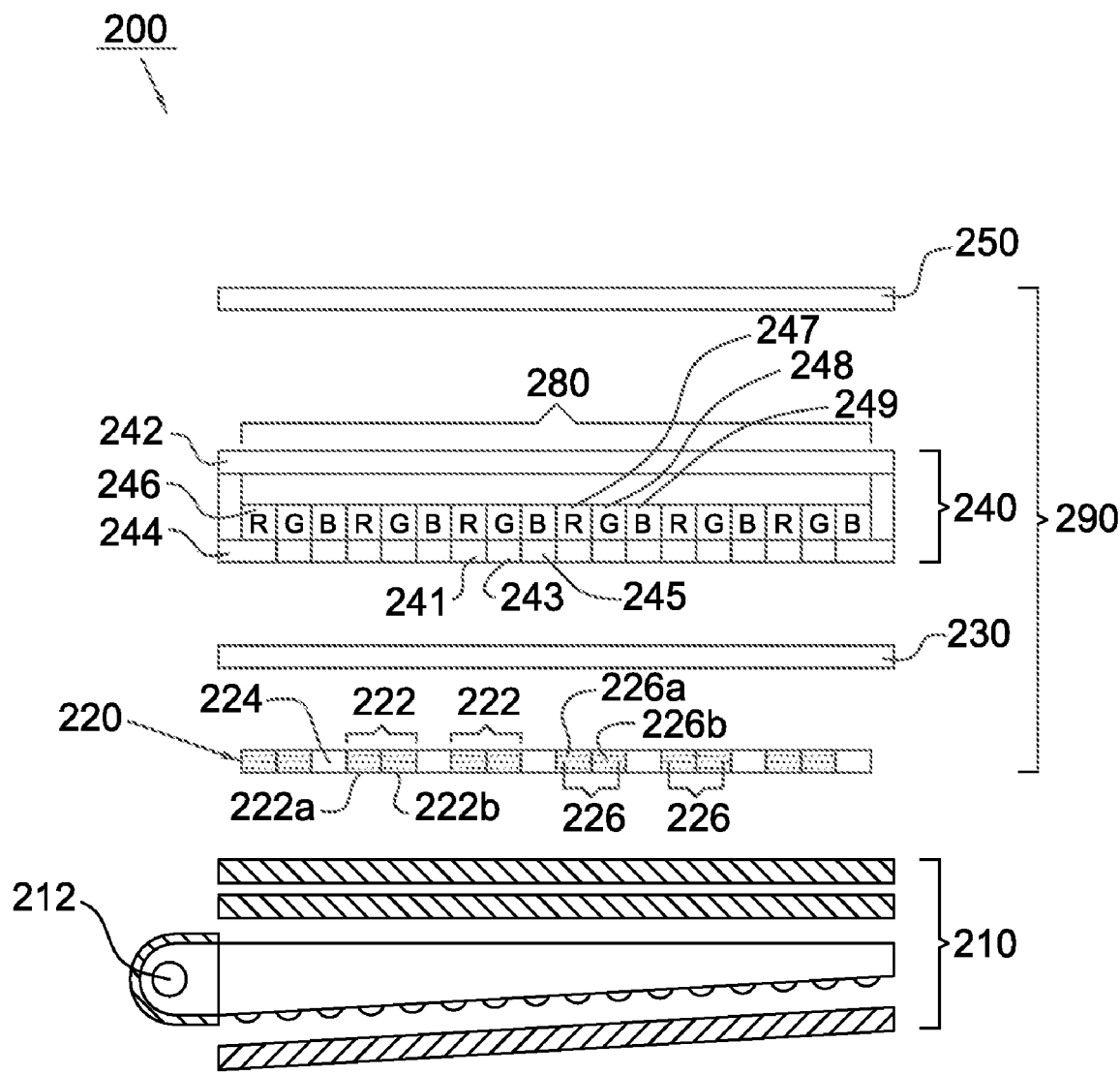
FIG. 2 is a schematic diagram illustrating a transmissive color liquid crystal display according to the first embodiment of the present invention.

With reference to FIG. 2, a transmissive color liquid crystal display 200 according to the first embodiment of the present invention includes a display panel 290 and a backlight module 210 disposed below the display panel 290. The backlight module includes a blue light source 212 such as a blue LED for emitting a blue light. The display panel 290 includes a liquid crystal cell 240 having a liquid crystal layer 246 sandwiched in between an upper transparent substrate 242 and a lower transparent substrate 244. A filter area 280 having a plurality of red filters 247, green filters 248 and blue filters 249 is disposed between the substrates 242, 244. The red filters 247, green filters 248 and blue filters 249 are respectively disposed on the first areas 241, the second areas 243 and third areas 245 of the lower transparent substrate 244. An upper polarizer 250 is disposed above the upper transparent substrate 242 and a lower polarizer 230 is disposed under the lower transparent substrate 244. A wavelength converter 220 is disposed below the lower polarizer 230 and has a plurality of wavelength conversion areas 222 and a plurality of transparent areas 224. The wavelength conversion areas 222 possess wavelength conversion capability of converting a light from one wavelength to another wavelength. The wavelength conversion areas 222 can be, for example, a film with fluorescent material 226 and has the ability of diffusing light. The transparent areas 224 are not capable of converting the wavelength of a light. The transparent areas 224 can be made of a transparent material or be a plurality of openings on the wavelength converter 220. The wavelength conversion areas 222 are disposed at the positions corresponding to a plurality of red and green filters 247, 248 while the transparent areas 224 are disposed at the positions corresponding to the third areas 245.

After passing through the wavelength conversion areas 222, the blue light emitted from the blue light source 212 of the backlight module 210 is converted to a broadband yellow light whose central wavelength is between 530 nm to 600 nm. The broadband yellow light will be subsequently converted to a desired red or green light when it passes through red or green filters 247, 248. The blue light will experience no change in wavelength when it passes through the transparent areas 224 and then passes through the blue filters 249 to be the desired blue light.

Figure 3:
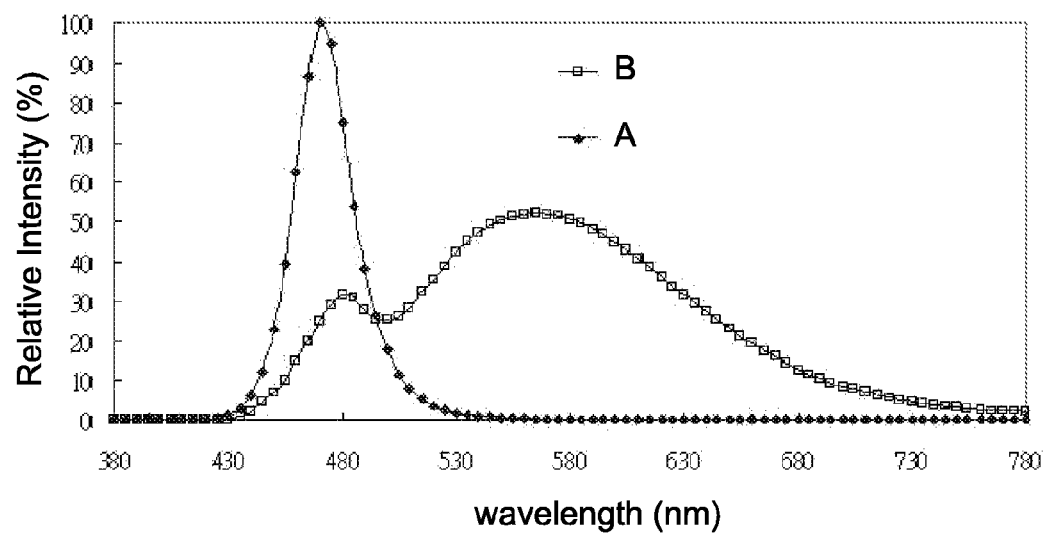
FIG. 3 illustrates the spectra of the light emitted from the blue backlight source of the transmissive color liquid crystal display in FIG. 2 both before and after passing through the wavelength conversion areas of the transmissive color liquid crystal display.
Figure 4:
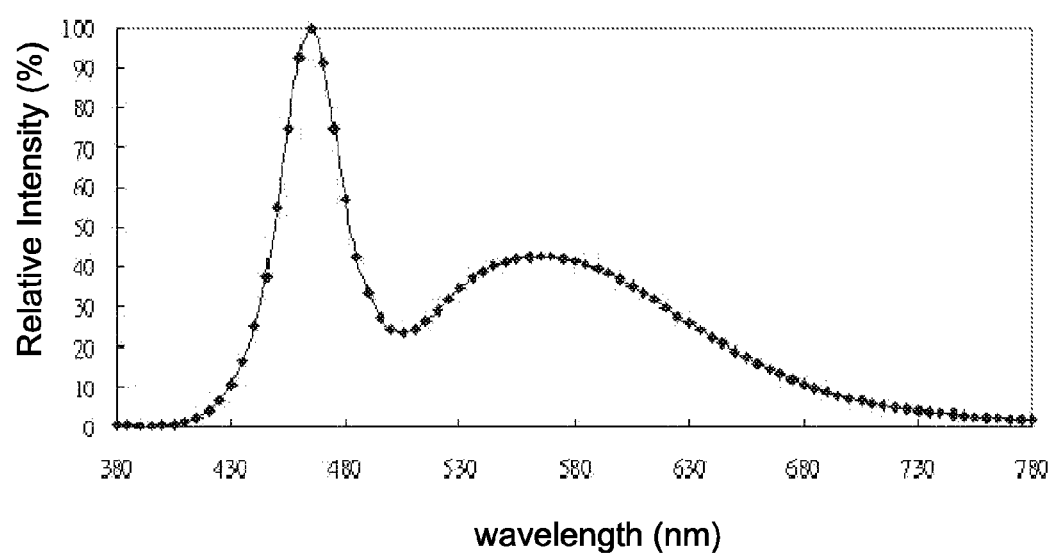
FIG. 4 illustrates the spectrum of the white backlight LED used in the conventional color liquid crystal display.

With reference to FIG. 3, it illustrates the spectra of the light emitted from the blue backlight source 212 both before and after passing through the wavelength conversion areas 222, wherein the curve A is the spectrum of the light directly emitted from the blue LED and the curve B is the spectrum of the light emitted from the blue LED and converted by the wavelength conversion areas 222. As shown in the figure, most of the blue light is converted to a broadband yellow light after passing the wavelength conversion areas 222 and only a little blue light component is remaining. With reference to FIG. 4, it illustrates the spectrum of a white backlight LED. As shown in the figure, the most intensive component in the spectrum is blue light and the intensity of yellow light component in the spectrum is only about one half of that of the blue light component. Accordingly, there is still a certain amount of blue light left in the spectrum after the white light emitted from the white backlight LED passes through the red filters or green filters. The resulting red or green lights will have a poor color purity and brightness. However, the resulting broadband yellow light converted from the blue light by the wavelength conversion areas 222 will be filtered into a red light or green light after passing through the red filter 247 or green filter 248. The resulting red or green lights possess a better color purity and brightness because the broadband yellow light has only a little blue light component.

With reference to Table 1, it illustrates the simulation results of the transmissive color liquid crystal display 200 with the wavelength conversion areas 222 according to the present invention and the conventional color liquid crystal display 100 with the white LED backlight 112, wherein L is the luminance, x and y are x and y coordinates of the C.I.E. color space respectively. As can be seen in the table, the NTSC Ratio of the display 200 has increased by about 30% as compared with that of the conventional display 100. The luminance of the display 200 has also increased by about 50% as compared with that of the display 100. It is therefore apparent that the liquid crystal display 200 with the wavelength conversion areas 222 has a relatively good color performance than the conventional liquid crystal display 100 with the white LED backlight 112.

TABLE 1

| Item | | L (cd/m$^2$) | x | y | NTSC Ratio (%) |
|---|---|---|---|---|---|
| Display without wavelength conversion area | R | 35.75 | 0.596 | 0.329 | 46.45 |
| | G | 89.51 | 0.319 | 0.517 | |
| | B | 25.53 | 0.134 | 0.112 | |
| | W | 150.79 | 0.295 | 0.296 | |
| Display with wavelength conversion area | R | 45.30 | 0.639 | 0.357 | 60.54 |
| | G | 175.80 | 0.347 | 0.575 | |
| | B | 38.20 | 0.122 | 0.087 | |
| | W | 259.30 | 0.276 | 0.297 | |

The performance difference between the displays 200 and 100 is because the fluorescent material 226 of the wavelength conversion areas 222 is different from that coated on or doped in the LED 112. Such performance difference is essentially resulted from the fact that the white light emitted from the white LED 112 has to possess a relatively large amount of blue light component so that the blue light to be displayed is still intensive enough after passing through the blue filters 249. The light emitted from wavelength conversion areas 222 is not required to have a blue light component because the blue light passing through the blue filters 249 is directly from the blue LED 212.

The color liquid crystal display 200 with the wavelength conversion areas 222 can still function well even in the absence of the blue filters 249. Specifically, the filter area 280 can consist essentially of a plurality of red filters 247 and a plurality of green filters 248 (not shown in the figure). Because the blue light emitted from the blue LED 212 includes only the blue light component, it is not necessary to filter the blue light by the blue filters 249. Such arrangement can reduce the production cost as well as the loss of blue light caused due to passing through the filters. In addition, the fluorescent material 226 in the wavelength conversion areas 222 can be coated on or doped in a substrate. The fluorescent material 226 has the structure of yttrium aluminum garnet (YAG) and its thickness is between about 10 nm to about 100000 nm. The film 222 can be made of acrylic resin, polyether sulfone (PES), poly ethylene terephthalate (PET), polycarbonate (PC) or polyarylate. The third areas 245 cover about 1% to about 40% of the total area of the first areas 241, second areas 243 and third areas 245. The first areas 241 and second areas 243 cover respectively about 10% to about 50% of the total area of the first areas 241, second areas 243 and third areas 245.

Furthermore, each of the wavelength conversion areas 222 of the color liquid crystal display 200 according to the first embodiment of the present invention can include a first wavelength conversion area 222a and a second wavelength conversion area 222b. The first wavelength conversion areas 222a are disposed at the positions corresponding to the red filters 247 while the second wavelength conversion areas 222b are disposed at the positions corresponding to the green filters 248. The fluorescent materials 226 on the first wavelength conversion areas 222a and second wavelength conversion areas 222b are a fluorescent material 226a and a fluorescent material 226b respectively. This will cause the blue light passing through the first wavelength conversion areas 222a is converted to a red light whose central wavelength is 620 nm to 780 nm, while the blue light passing through the second wavelength conversion areas 222b is converted to a green light whose central wavelength is between 500 nm to 580 nm. The converted red light and green light will be further converted to a desired red or green light when they pass through the red filters 247 and green filters 248 respectively.

Figure 5:
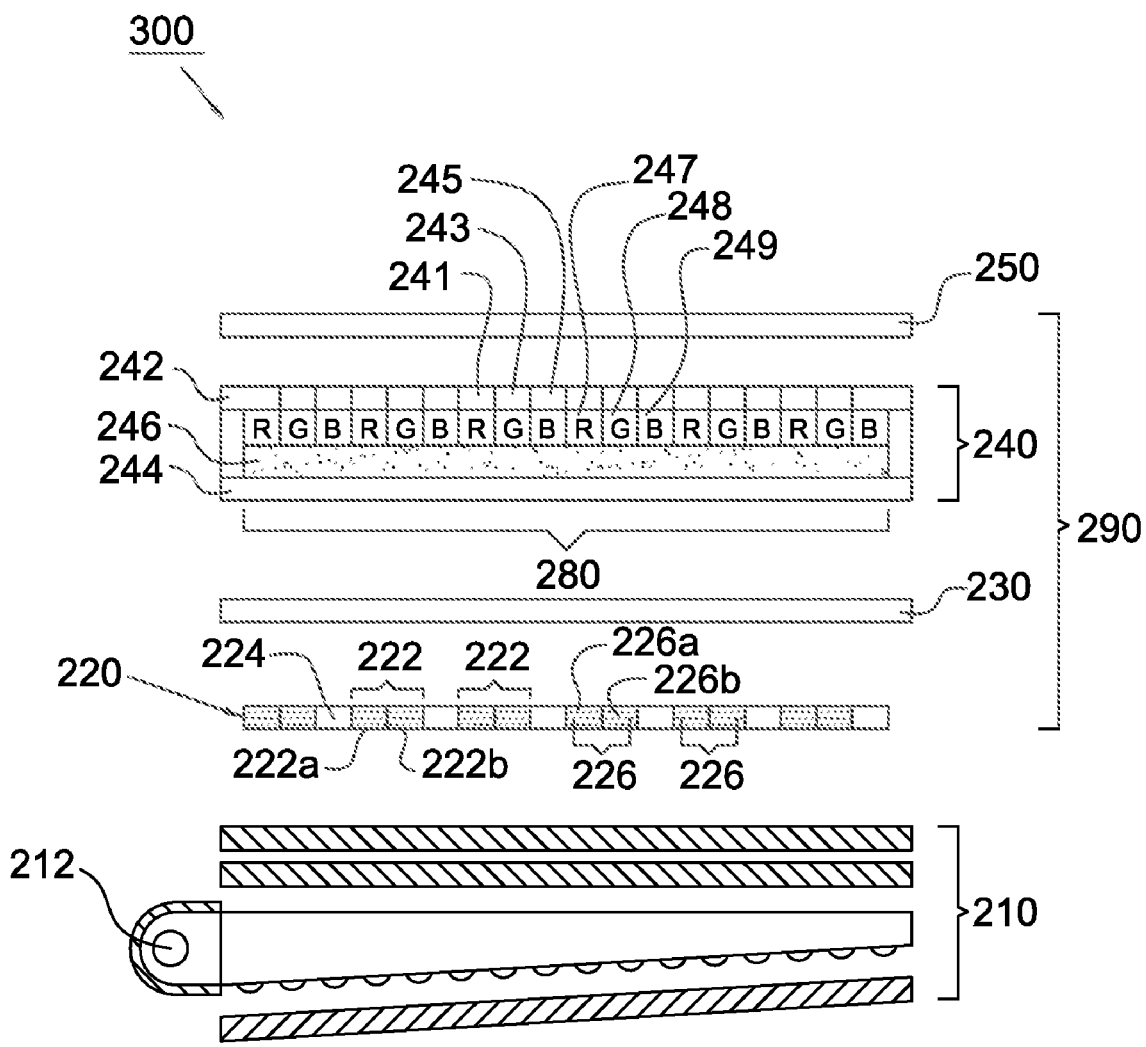
FIG. 5 is a schematic diagram illustrating a transmissive color liquid crystal display according to the second embodiment of the present invention.

With reference to FIG. 5, a transmissive color liquid crystal display 300 according to the second embodiment of the present invention is similar to the display 200 shown in FIG. 2. Thus, any further illustrations of the display 300 are omitted herein. The difference between the displays 200 and 300 is that the red filters 247, green filters 248 and blue filters 249 in the display 300 are disposed on the upper transparent substrate 242.

Figure 6:
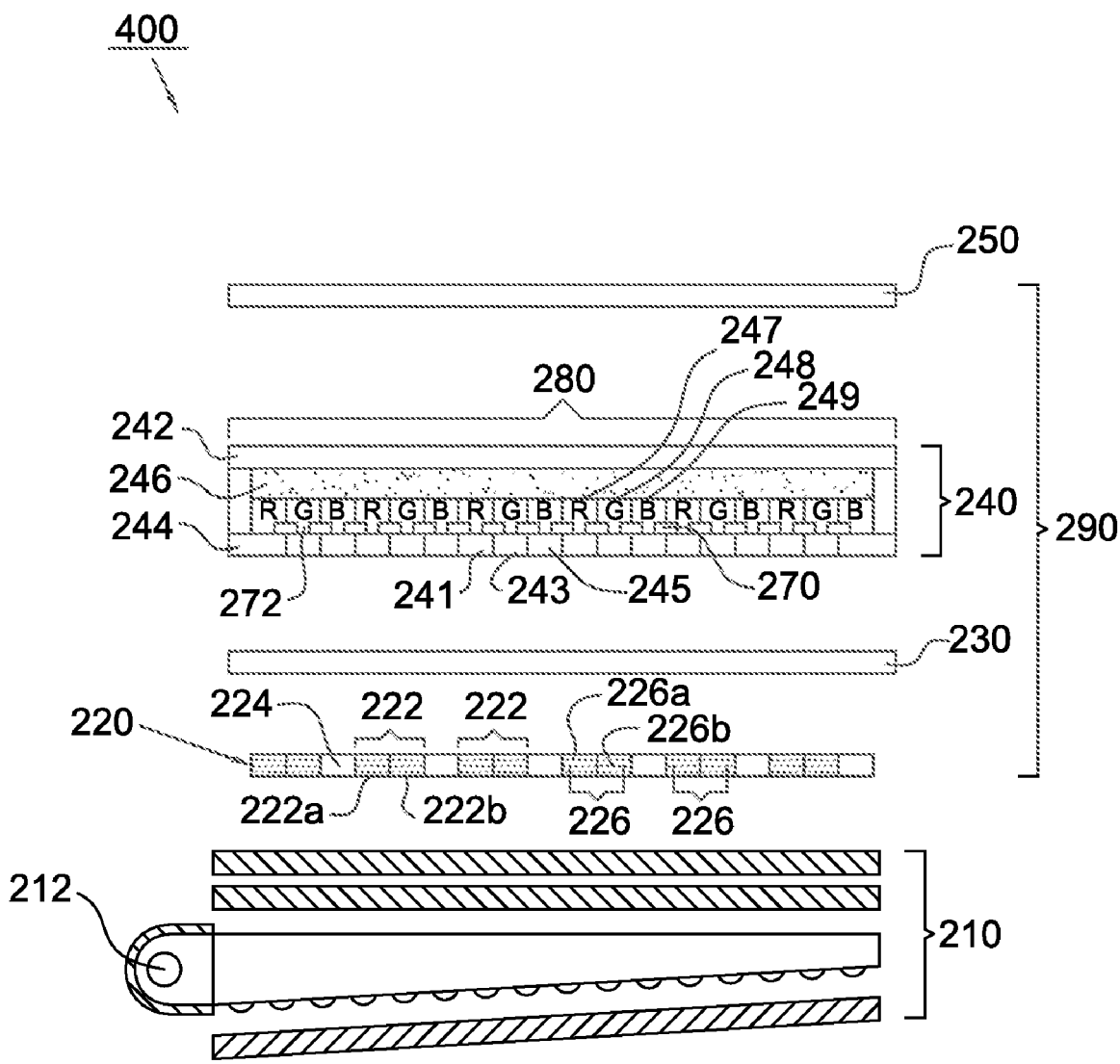
FIG. 6 is a schematic diagram illustrating a transflective color liquid crystal display according to the third embodiment of the present invention.

With reference to FIG. 6, a transflective color liquid crystal display 400 according to the third embodiment of the present invention is the same as the display 200 shown in FIG. 2 except that the display 400 further includes a reflection layer 270 having a plurality of openings 272 thereon and the reflection layer 270 is disposed on the lower transparent substrate 244. The blue light emitted from the LED 212 can travel through the openings 272 to reach a viewer's eyes. An ambient light can be reflected by the reflection layer 270 to serve as illuminating light and thus the overall power consumption of the display 400 is reduced.

Figure 7:
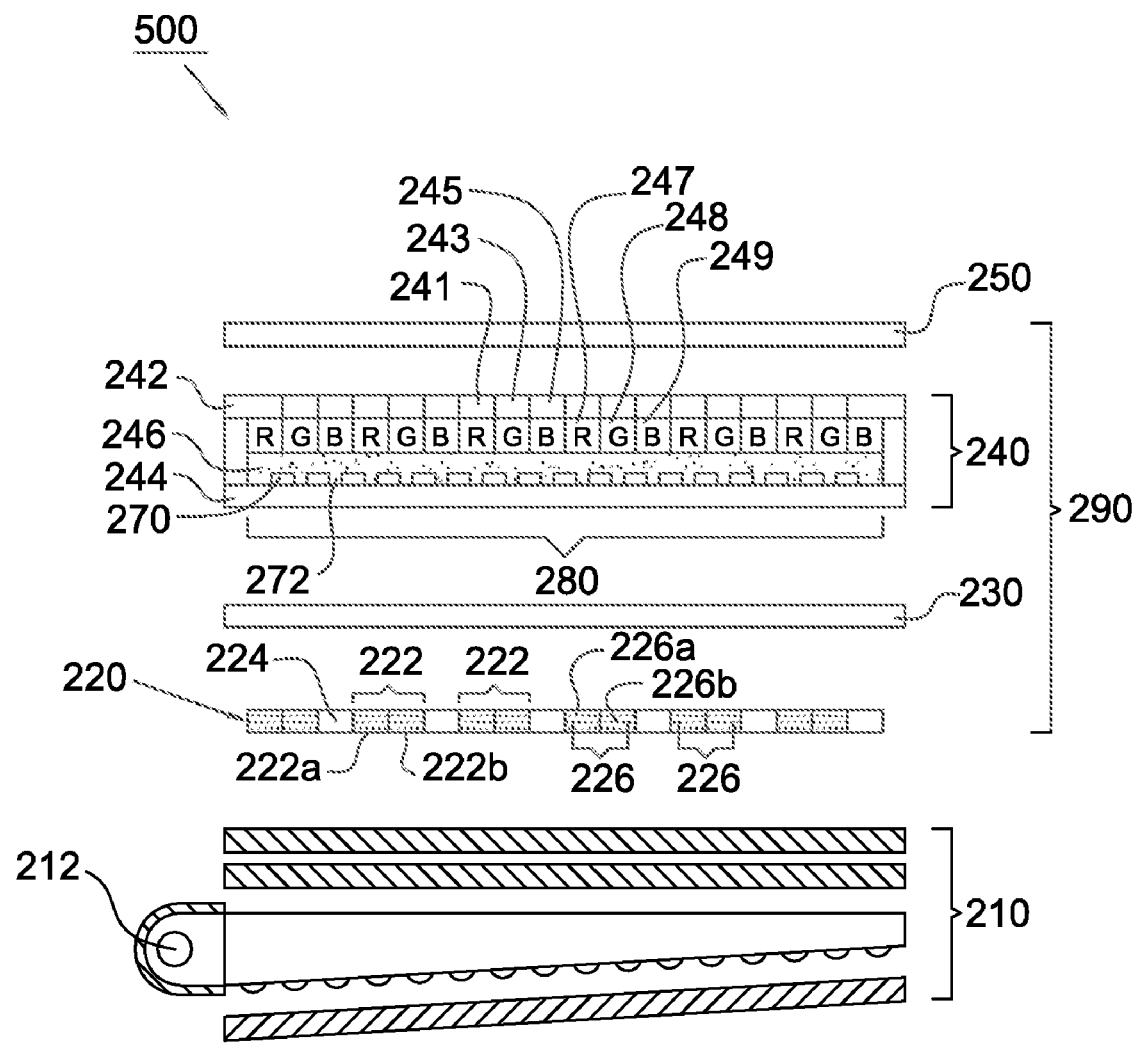
FIG. 7 is a schematic diagram illustrating a transflective color liquid crystal display according to the fourth embodiment of the present invention.

With reference to FIG. 7, a transflective color liquid crystal display 500 according to the fourth embodiment of the present invention is the same as the display 300 shown in FIG. 5 except that the display 500 further includes a reflection layer 270 having a plurality of openings 272 thereon and the reflection layer 270 is disposed on the lower transparent substrate 244. In addition, the red filters 247, green filters 248 and blue filters 249 in the display 500 are disposed on the upper transparent substrate 242, which is different from the display 400 of which filters 247, 248 and 249 are disposed on the lower transparent substrate 244.

The openings 272 formed on the first areas 241 in the transflective color liquid crystal displays 400 and 500 cover about 2% to about 99% of the first areas 241. The openings 272 formed on the second areas 243 cover about 2% to about 99% of the second areas 243. The openings 272 formed on the third areas 245 cover about 1% to about 60% of the third areas 245. Since the displays 400 and 500 are similar to the display 200, any further illustrations of the same elements will be omitted.

The color liquid crystal displays of the present invention have the wavelength conversion areas and thus can present excellent color brightness and saturation. Such excellent performance can be achieved by using backlights of single color. Furthermore, the color liquid crystal displays of the present invention are not required to be provided with blue filters, and the production cost as well as the loss of blue light caused due to passing through the filters can thus be reduced.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A transmissive color liquid crystal display, comprising:
two opposite upper and lower transparent substrates, wherein the surface of one transparent substrate facing the opposite transparent substrate has a plurality of first areas, a plurality of second areas and a plurality of third areas;
a liquid crystal layer disposed between the two transparent substrates;
a plurality of red filters disposed on the first areas;
a plurality of green filters disposed on the second areas;
a backlight module having a blue light source disposed below the lower transparent substrate;
a wavelength converter disposed between the lower transparent substrate and backlight module, the wavelength converter having a plurality of wavelength conversion areas and a plurality of transparent areas, the wavelength conversion areas being disposed at the positions corresponding to the red filters and green filters to convert the blue light emitted from the blue light source into light that has a central wavelength between 530 nm and 600 nm, the transparent areas being disposed at the positions corresponding to the third areas;
a first polarizer disposed above the upper transparent substrate; and
a second polarizer disposed between the wavelength converter and lower transparent substrate.

2. The transmissive color liquid crystal display as claimed in claim 1, wherein the wavelength conversion areas are made of a film with fluorescent material.

3. The transmissive color liquid crystal display as claimed in claim 2, wherein the fluorescent material comprises yttrium aluminum garnet (YAG).

4. The transmissive color liquid crystal display as claimed in claim 2, wherein the fluorescent material is coated on the wavelength conversion areas.

5. The transmissive color liquid crystal display as claimed in claim 2, wherein the fluorescent material is doped in the wavelength conversion areas.

6. The transmissive color liquid crystal display as claimed in claim 2, wherein the fluorescent material has a thickness of between about 10 nm to about 100000 nm.

7. The transmissive color liquid crystal display as claimed in claim 2, wherein the film is made of one selected from the group consisting of acrylic resin, polyether sulfone (PBS), poly ethylene terephthalate (PET), poly carbonate (PC) and polyarylate.

8. The transmissive color liquid crystal display as claimed in claim 1, wherein the third areas cover about 1% to about 40% of the total area of the first areas, second areas and third areas, the first areas and second areas cover respectively about 10% to about 50% of the total area of the first areas, second areas and third areas.

9. The transmissive color liquid crystal display as claimed in claim 1, wherein the transparent areas are made of a transparent material.

10. The transmissive color liquid crystal display as claimed in claim 1, wherein the transparent areas are a plurality of openings formed on the wavelength converter.

11. A color liquid crystal display, comprising:
two opposite upper and lower transparent substrates, wherein the surface of one of the two transparent substrates facing the opposite transparent substrate has a plurality of first areas, a plurality of second areas and a plurality of third areas;
a liquid crystal layer disposed between the two transparent substrates;
a filter area consisting essentially of a plurality of red filters and a plurality of green filters, the red filters disposed on the first areas, the green filters disposed on the second areas;

a backlight module having a blue light source disposed below the lower transparent substrate;

a wavelength converter disposed between the lower transparent substrate and backlight module, the wavelength converter having a plurality of wavelength conversion areas and a plurality of transparent areas, the wavelength conversion areas being disposed at the positions corresponding to the red filters and green filters to convert the blue light emitted from the blue light source into light that has a central wavelength between 530 nm and 600 nm, the transparent areas being disposed at the positions corresponding to the third areas;

a first polarizer disposed above the upper transparent substrate; and a second polarizer disposed between the wavelength converter and lower transparent substrate.

12. The color liquid crystal display as claimed in claim 11, further comprising:

a reflection layer having a plurality of openings thereon, the reflection layer disposed on the lower transparent substrate and facing the upper transparent substrate.

13. The color liquid crystal display as claimed in claim 11, wherein the wavelength conversion areas are made of a film with fluorescent material.

14. The color liquid crystal display as claimed in claim 13, wherein the fluorescent material comprises yttrium aluminum garnet (YAG).

15. The color liquid crystal display as claimed in claim 13, wherein the fluorescent material is coated on the wavelength conversion areas.

16. The color liquid crystal display as claimed in claim 13, wherein the fluorescent material is doped in the wavelength conversion areas.

17. The color liquid crystal display as claimed in claim 13, wherein the fluorescent material has a thickness of between about 10 nm to about 100000 nm.

18. The color liquid crystal display as claimed in claim 13, wherein the film is made of one selected from the group consisting of acrylic resin, polyether sulfone (PES), poly ethylene terephthalate (PET), poly carbonate (PC) and polyarylate.

19. The color liquid crystal display as claimed in claim 11, wherein the third areas cover about 1% to about 40% of the total area of the first areas, second areas and third areas, the first areas and second areas cover respectively about 10% to about 50% of the total area of the first areas, second areas and third areas.

20. The color liquid crystal display as claimed in claim 11, wherein the transparent areas are made of a transparent material.

* * * * *